United States Patent
Funk et al.

(10) Patent No.: US 8,851,568 B2
(45) Date of Patent: Oct. 7, 2014

(54) RETRACTABLE PASSENGER SEAT

(75) Inventors: Robert Funk, Grapevine, TX (US); Rebeca Rubio Trevizo, Chihuahua (MX); Fernando Luis Bencomo Arvizo, Chihuahua (MX); Gabriela Alejandra Gonzalez Gonzalez, Chihuahua (MX); Raul Daniel Flores Aguirre, Chihuahua (MX)

(73) Assignee: Zodiac Seats US LLC, Gainesville, TX (US)

( * ) Notice: Subject to any disclaimer, the term of this patent is extended or adjusted under 35 U.S.C. 154(b) by 193 days.

(21) Appl. No.: 13/287,158

(22) Filed: Nov. 2, 2011
(Under 37 CFR 1.47)

(65) Prior Publication Data
US 2012/0280541 A1    Nov. 8, 2012

Related U.S. Application Data

(60) Provisional application No. 61/456,661, filed on Nov. 10, 2010.

(51) Int. Cl.
| | | |
|---|---|---|
| A47C 15/00 | (2006.01) |
| B60N 2/30 | (2006.01) |
| B64D 11/06 | (2006.01) |
| B60N 2/46 | (2006.01) |
| B60N 3/00 | (2006.01) |
| B60N 3/10 | (2006.01) |
| B60N 2/44 | (2006.01) |

(52) U.S. Cl.
CPC .............. *B64D 11/06* (2013.01); *B60N 2/3047* (2013.01); *B60N 2/4606* (2013.01); *B60N 3/002* (2013.01); *B64D 2011/0606* (2013.01); *B60N 3/102* (2013.01); *B60N 2/4495* (2013.01); *B60N 2/3015* (2013.01)

USPC .......... 297/245; 297/14; 297/335; 244/118.6; 244/122 R

(58) Field of Classification Search
USPC .............. 297/118, 330, 14, 160, 162, 174 R, 297/188.01, 188.04, 217.4, 468, 481, 245, 297/411.3, 335; 244/118.5, 118.6, 122 R
See application file for complete search history.

(56) References Cited

U.S. PATENT DOCUMENTS 2,420,251 A    5/1947  Foriyes
2,583,372 A *  1/1952  Hall ................................. 297/14
(Continued)

FOREIGN PATENT DOCUMENTS

CA           145487      6/2013
DE       102008038346    5/2009
(Continued)

OTHER PUBLICATIONS

Office Action dated May 16, 2013 in U.S. Appl. No. 29/405,399.
(Continued)

*Primary Examiner* — David R Dunn
*Assistant Examiner* — Alexander Harrison
(74) *Attorney, Agent, or Firm* — Kilpatrick Townsend & Stockton LLP; Tiffany L. Williams, Esq.; Dean W. Russell, Esq.

(57) ABSTRACT

Described are passenger seat assemblies having at least one seat back support pivotally coupled to an overhead support structure, at least one seat pan pivotally coupled to the at least one seat back support, and at least one foot rest support may be pivotally coupled to the seat pan. The seat back support may be configured to rotate into a retracted position adjacent the overhead support structure. The seat pan may be configured to rotate into a retracted position adjacent the seat back support. Finally, the foot rest support may be configured to rotate into a retracted position adjacent the seat pan.

19 Claims, 7 Drawing Sheets

(56) References Cited

U.S. PATENT DOCUMENTS

| | | | | |
|---|---|---|---|---|
| 2,859,803 | A | * | 11/1958 | McCallister ............. 297/245 |
| 3,825,299 | A | * | 7/1974 | Gaucher ............. 297/157.1 |
| 4,620,702 | A | * | 11/1986 | Hemmeter ............. 297/245 |
| 4,913,487 | A | * | 4/1990 | Breckel et al. ............. 297/14 |
| 5,224,902 | A | * | 7/1993 | Stremler ............. 472/118 |
| 5,795,018 | A | | 8/1998 | Schumacher et al. |
| 5,902,187 | A | * | 5/1999 | Boring ............. 472/125 |
| 6,056,239 | A | * | 5/2000 | Cantu et al. ............. 244/118.6 |
| 6,152,401 | A | * | 11/2000 | Green ............. 244/118.6 |
| D443,990 | S | | 6/2001 | Beroth |
| 6,547,328 | B2 | * | 4/2003 | Liu ............. 297/245 |
| 6,644,736 | B2 | | 11/2003 | Nguyen et al. |
| D487,981 | S | | 4/2004 | Lüdeke et al. |
| 6,776,455 | B2 | | 8/2004 | Longtin et al. |
| 6,994,631 | B1 | * | 2/2006 | Habing ............. 472/125 |
| D592,412 | S | | 5/2009 | Suge et al. |
| 7,850,205 | B2 | * | 12/2010 | Pisaniello et al. ......... 280/801.1 |
| D661,116 | S | | 6/2012 | Darbyshire |
| D678,688 | S | | 3/2013 | White et al. |
| 2001/0000639 | A1 | * | 5/2001 | Park et al. ............. 297/411.3 |
| 2006/0175882 | A1 | * | 8/2006 | Schweizer ............. 297/217.3 |
| 2007/0045468 | A1 | | 3/2007 | Casey |
| 2009/0243352 | A1 | * | 10/2009 | Cailleteau ............. 297/188.01 |
| 2009/0302158 | A1 | * | 12/2009 | Darbyshire et al. ....... 244/118.6 |

FOREIGN PATENT DOCUMENTS

| | | |
|---|---|---|
| EM | 0020357900001 | 7/2012 |
| GB | 2465212 | 5/2010 |
| WO | 2010004111 | 1/2010 |
| WO | 2012064556 | 5/2012 |

OTHER PUBLICATIONS

International Preliminary Report on Patentability dated May 23, 2013 in Application No. PCT/US2011/058862.
Response filed May 14, 2013 in Canadian Design Application No. 145487.
International Search Report and Written Opinion dated Dec. 30, 2011 in Application No. PCT/US2011/058862.
Design U.S. Appl. No. 29/405,399, filed Nov. 2, 2011.
Office Action dated Sep. 5, 2012 in Canadian Design Registration No. 145487.
Response dated Dec. 21, 2012 in Canadian Design Registration No. 145487.
Office Action dated Jan. 18, 2013 in Canadian Design Registration No. 145487.
Notice of Allowance dated Jul. 25, 2013 in U.S. Appl. No. 29/405,399.

* cited by examiner

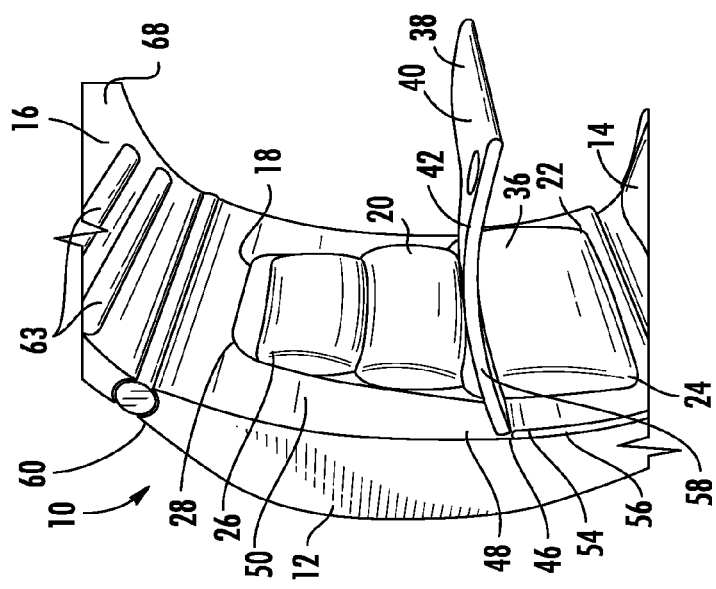
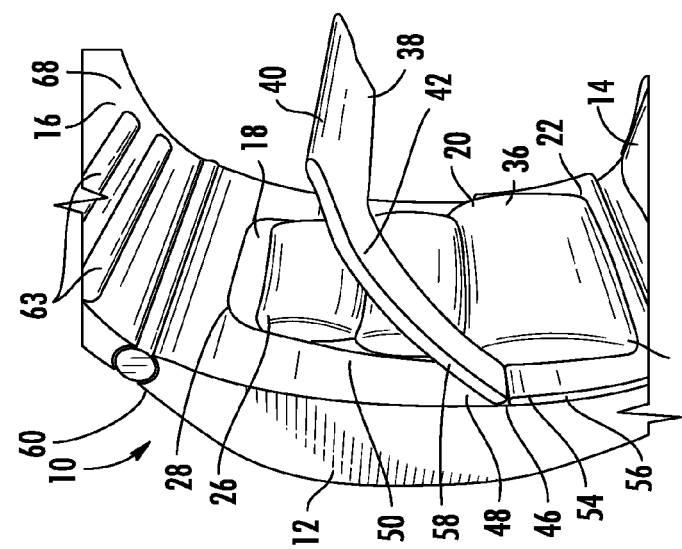
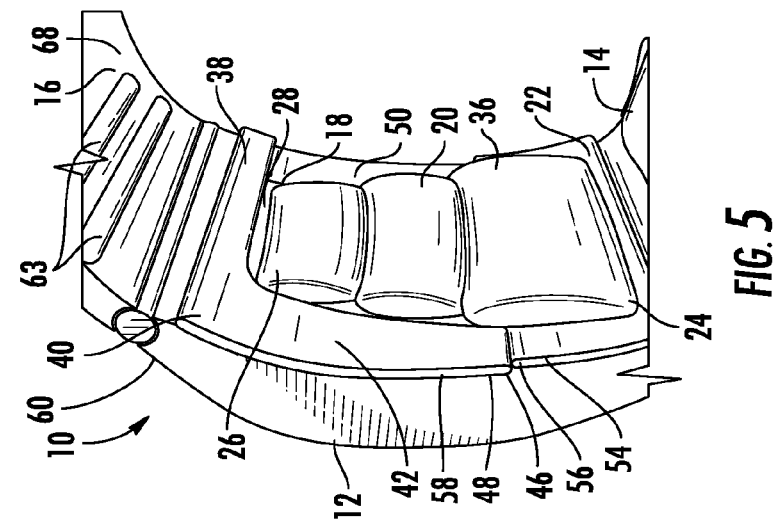

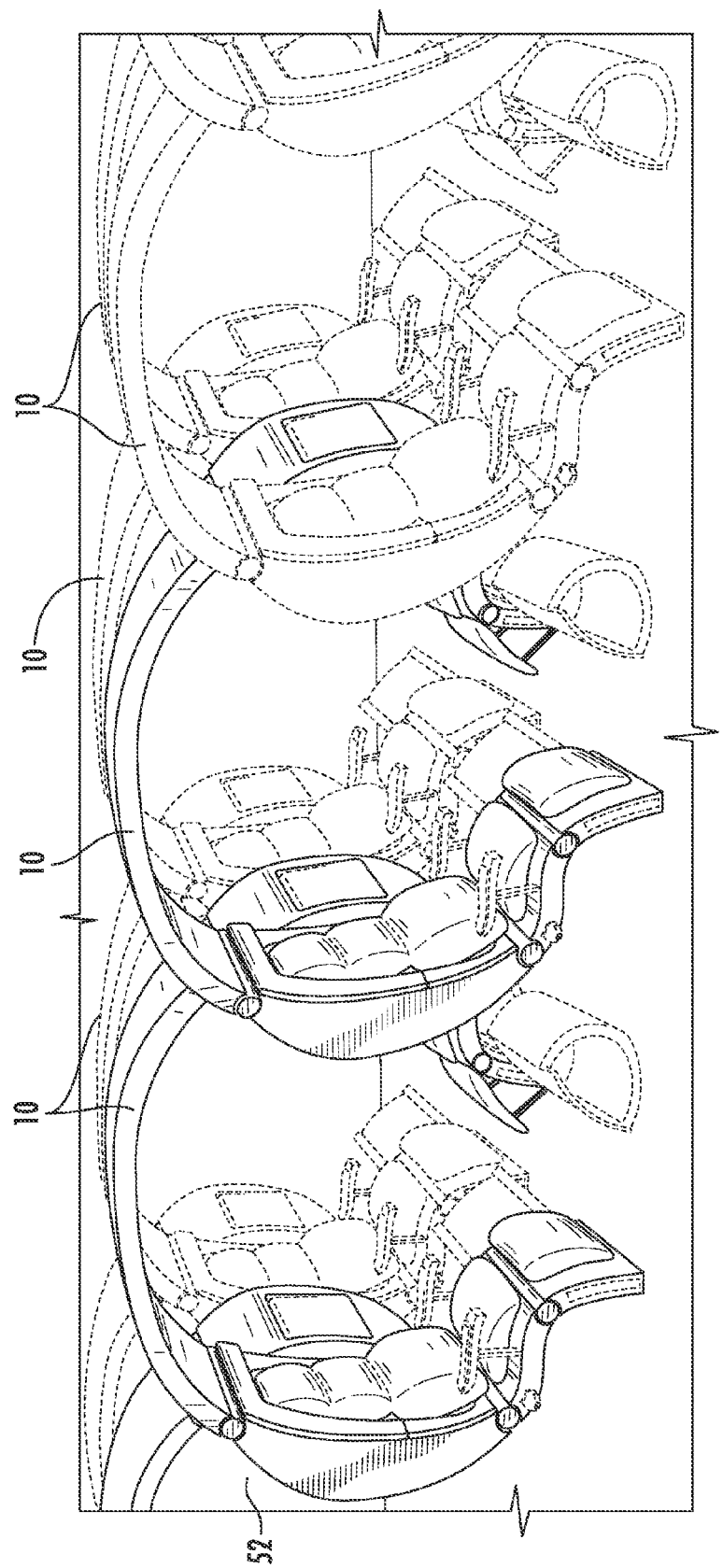

RETRACTABLE PASSENGER SEAT

CROSS REFERENCE TO RELATED APPLICATION

This application is related to and claims priority benefits from U.S. Provisional Application Ser. No. 61/456,661, filed on Nov. 10, 2010, entitled RINGLET AIRCRAFT SEAT. The '661 application is hereby incorporated herein in its entirety by this reference.

FIELD OF THE INVENTION

The invention relates to passenger seats or the like.

BACKGROUND

Common carriers, such as passenger airlines, bus lines, train lines, and passenger vehicles frequently convey substantial numbers of passengers simultaneously. In many instances, the number of seats within a given space may limit the amount space available for each passenger to such a degree that passengers have very little personal space. For example, a passenger's personal space between the passenger's knees and the passenger seat located forward of that passenger may be diminished by a reclining seat back of the next-forward passenger seat. Also, in many designs, a passenger's use of a tray table is impacted by movement of the next-forward passenger seat.

It is also frequently the case that at least some passenger seats are not occupied during a trip. However, due to the compact arrangement of passenger seats in most common carriers, the passengers seated in the remaining passenger seats acquire minimal additional personal space from these unoccupied passenger seats.

Thus, it may be desirable to provide a passenger seat assembly that provides a passenger with additional personal space, as well as providing the passenger with a sensation of privacy, which may enhance the impression of the amount of personal space available. It may also be desirable to provide for a way to minimize the space consumed by unoccupied passenger seats, as well as providing for an easier pathway to enter and exit compact arrangements of passenger seats.

SUMMARY

Embodiments of the present invention include a passenger seat assembly comprising at least one seat back support pivotally coupled to an overhead support structure and at least one seat pan pivotally coupled to the at least one seat back support. At least one foot rest support may be pivotally coupled to the seat pan, and at least one foot rest may be pivotally coupled to the foot rest support and configured to rotate between a stowed position and a deployed position.

In some embodiments, the at least one seat back support comprises a recess configured to receive a seat back, wherein sides of the recess surround at least a portion of the seat back when the seat back is in a reclined position. The passenger seat assembly may also include a tray table that is configured to stow in a location adjacent a portion of an outer profile of the recess, arm rests that are configured to be positioned approximately flush with the at least one seat pan in a stowed position, and/or an in-flight entertainment display positioned in a rear surface of the at least one seat back support. A stowage compartment may also be positioned adjacent the at least one seat back support and coupled to a lower support structure.

The passenger seat assembly may also comprise a passenger belt having a pair of straps, wherein each strap is coupled to a mounting structure within the at least one seat pan and extends through an aperture in the at least one seat pan. An end of each of the pair of straps may be coupled to a latching projection or a latching receptacle, wherein the latching projection and the latching receptacle are configured not to fit within the aperture so that the end of the strap remains outside the at least one seat pan when the strap is in a retracted position within the at least one seat pan.

In some embodiments, the passenger seat assembly may comprise an overhead support structure comprising a first pivot location and a second pivot location, a first seat back support pivotally coupled to the first pivot location in a forward-facing direction, and a second seat back support pivotally coupled to the second pivot location in an aft-facing direction. The first and second seat back supports may be configured to rotate into a retracted position adjacent the overhead support structure. At least one of the first and second seat back supports may be pivotally coupled to a seat pan, which may in turn be pivotally coupled to a foot rest support. The seat pan may be configured to rotate into a retracted position adjacent the at least one first and second seat back supports and the foot rest support may be configured to rotate into a retracted position adjacent the seat pan.

BRIEF DESCRIPTION OF THE DRAWINGS

FIG. 5 is a partial front perspective view of the passenger seat assembly of FIG. 1 with a tray table in a stowed position.

FIG. 6 is a partial front perspective view of the passenger seat assembly of FIG. 1 with a tray table in a partially deployed position.

FIG. 7 is a partial front perspective view of the passenger seat assembly of FIG. 1 with a tray table in a fully deployed position.

FIG. 14 is a front perspective view of the passenger seat assembly of FIG. 1 assembled with other passenger seat assemblies in an aircraft or vehicle cabin.

DETAILED DESCRIPTION

The described embodiments of the invention provide passenger seat assemblies with a retractable design. While the passenger seat assemblies are discussed for use with aircraft seats, they are by no means so limited. Rather, embodiments of the passenger seat assemblies may be used in passenger seats or other seats of any type or otherwise as desired.

FIGS. 1-14 illustrate embodiments of a passenger seat assembly 10. In these embodiments, the passenger seat assembly 10 comprises at least one seat back support 12, at least one seat pan 14, and an overhead support structure 16. The seat back support 12, seat pan 14, and overhead support structure 16 may be formed of materials including but not limited to aluminum, stainless steel, other metallic materials, composite materials, or other similar materials.

Figure 11:
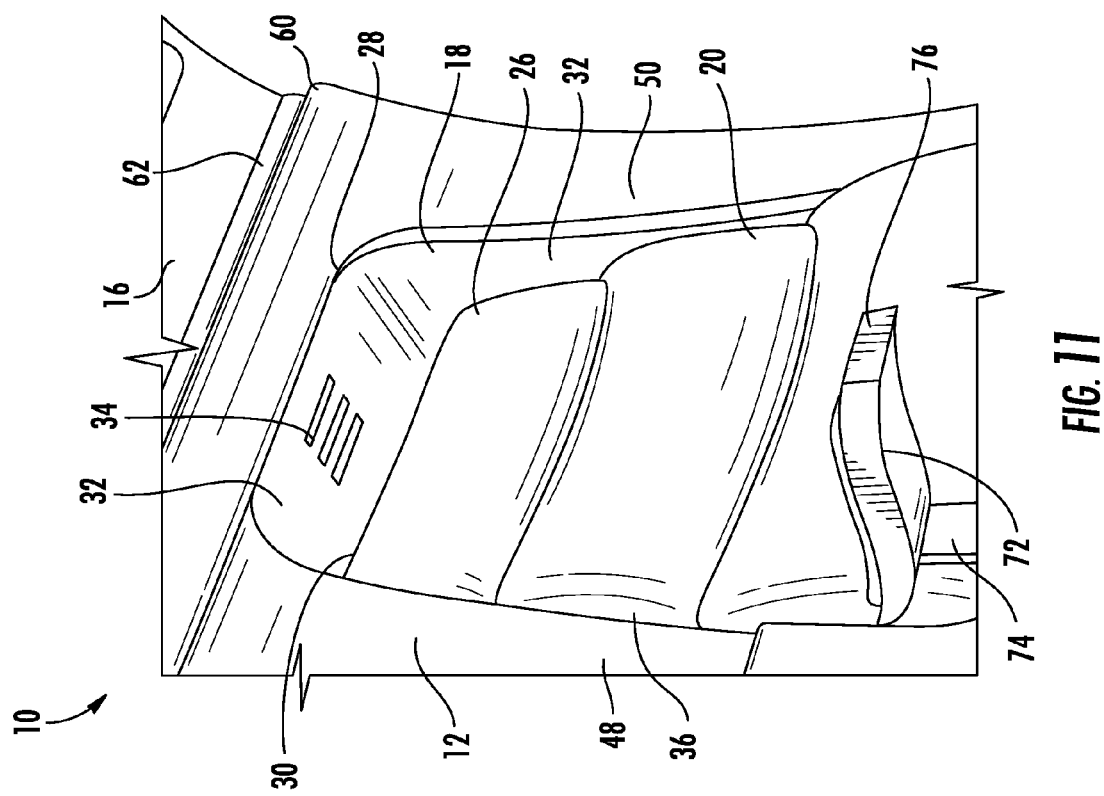
FIG. 11 is a partial front perspective view of the passenger seat assembly of FIG. 1 in a reclined position.
Figure 13:
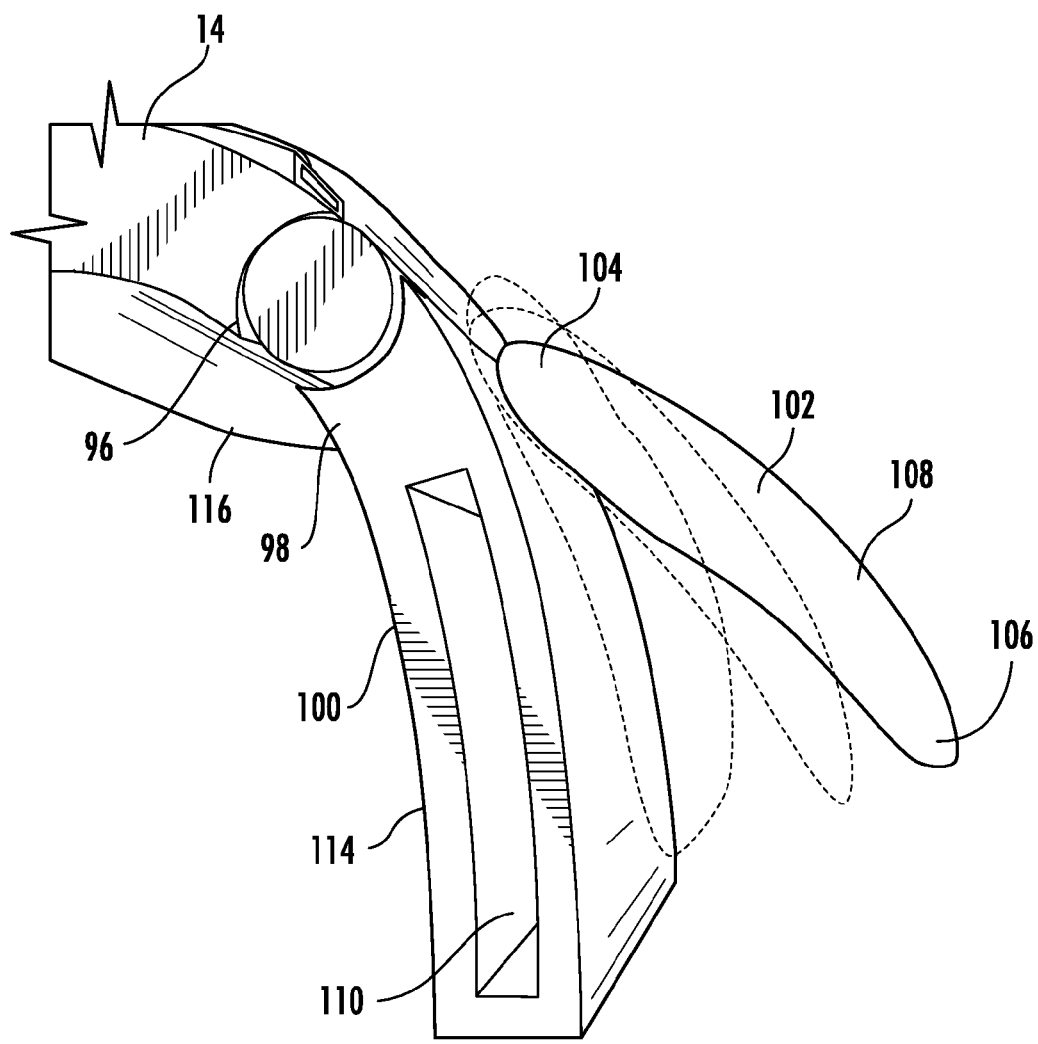
FIG. 13 is a perspective view of a foot rest traveling between a stowed position and a deployed position.

In some embodiments, such as the embodiment shown in FIGS. 5-7 and 11, the seat back support 12 comprises a recess 18. The recess 18 may be configured to receive at least a portion of a seat back 20. In certain embodiments, as shown in FIGS. 5-7 and 11, a lower end 22 of the seat back 20 is pivotally coupled to a lower edge 24 of the recess 18. In these embodiments, an upper end 26 of the seat back 20 may travel between an upright position that is proximate an upper edge 28 of the recess 18 (as shown in FIGS. 5-7) and a fully reclined position that substantially contacts a rear surface 30 of the recess 18 (as shown in FIG. 11). Any suitable recline mechanism may be used to adjust the position of the seat back 20 including but not limited to a recline lock or other suitable mechanism that releasably locks the seat back 20 at any suitable position between and including the fully upright and fully reclined positions.

Because the seat back support 12 may be configured to accommodate the fully reclined position of the seat back 20, dimensions of the recess 18 may be shaped to substantially correspond to the shape created by the reclining path of the seat back 20. Thus, when the seat back 20 is reclined to a position that extends at least partially within the recess 18, sides 32 of the recess 18 surround at least a portion of the passenger's head and upper body. This partial surrounding of the passenger by the sides 32 when the seat back 20 is reclined may create a sense of private space for the passenger. In some embodiments, the sides 32 may include speakers 34 that provide directional sound options for the passenger. In other embodiments, the sides 32 may also include additional lighting options.

The seat back 20 may further comprise a cushion 36 that is coupled to the seat back 20. The cushion 36 may also serve as a flotation device. In these embodiments, to perform as a flotation device, the cushion 36 includes some amount of flotation material including but not limited to closed-cell foams and flotation foams. In other embodiments, the cushion 36 may not serve as a flotation device and may include any suitable cushion material that provides the desired amount of comfort and support to the passenger.

The seat back support 12 may further comprise a tray table 38. In some embodiments, the tray table 38 may include a work surface 40 and an arm 42. In these embodiments, the work surface 40 and arm 42 may be integrally formed as a single unit. In other embodiments, the tray table 38 may have any suitable design that allows the tray table 38 to be stowed out of the passenger's way when not in use and released from the stowed position into a deployed position in front of the passenger for his or her use.

In some embodiments, as shown in FIGS. 5-7, an end 46 of the arm 42 may be pivotally coupled to a side edge 48 of the recess 18. The arm 42 and the work surface 40 may be shaped to substantially conform to a portion of an outer profile 50 of the recess 18 when the tray table 38 is stowed. In these embodiments, as shown in FIG. 5, the work surface 40 is positioned proximate the upper edge 28 of the recess 18 and the arm 42 is positioned proximate the side edge 48 when stowed. A latch may be used to retain the tray table 38 in a stowed position. The type of latch includes but is not limited to a slam latch, a pivot latch, snaps, hook and loop fasteners, snap-fit, or any other suitable releasable fastening device.

To transition the tray table 38 from the stowed position (as shown in FIG. 5) to a deployed position (as shown in FIG. 7), a passenger releases the work surface 40 from the stowed position. The work surface 40 and the arm 42 then rotate downward via the pivot connection between the arm 42 and the side edge 48 until the arm 42 contacts a table stop 54. In these embodiments, the table stop 54 may be a component that is shaped to substantially conform to another portion of the outer profile 50 of the recess 18 below the location where the arm 42 is coupled to the side edge 48. A thickness 56 of the table stop 54 may be configured to substantially correspond to a thickness 58 of the arm 42 and/or the work surface 40 so that the table stop 54, arm 42, and work surface 40 form a partial frame that surrounds a portion of the recess 18 when the tray table 38 is stowed, as illustrated in FIG. 5. Thus, in these embodiments, the arm 42 is prevented from further downward rotation when the arm 42 contacts the thickness 56 of the table stop 54.

The position of the table stop 54 relative to the coupling location between the arm 42 and the side edge 48 may be adjusted as needed to control the deployed position of the work surface 40 relative to a horizontal axis. In some embodiments, it may be desirable to have the work surface 40 form a desired angle $\alpha$ relative to a horizontal axis. Typically, the desired angle $\alpha$ is based on the amount of angle needed to compensate for the flight angle or nose-up attitude of the aircraft so that the work surface 40 is approximately level for the passenger's use during flight. However, the height of the table stop 54 may be adjusted so that any suitable angle $\alpha$ may be achieved based on the preference of the particular aircraft and/or the purpose of the tray table 38.

An upper edge 60 of the seat back support 12 may be pivotally coupled to a first pivot location 62 of the overhead support structure 16. The pivotal coupling between the seat back support 12 and the overhead support structure 16 may include any suitable coupling arrangement that allows the seat back support 12 to releasably pivot relative to the overhead support structure 16, while also including a locking mechanism to secure the position of the seat back support 12 relative to the overhead support structure 16 so that the overhead support structure 16 may provide sufficient structural stability and support for the passenger seat assembly 10. Examples of suitable releasable locking mechanisms include but are not limited to recline locks, gas springs, or other suitable mechanisms.

In some embodiments, as shown in FIG. 14, the overhead support structure 16 is coupled to an overhead structure of a passenger cabin 52 in an aircraft or vehicle. The coupling between the overhead support structure 16 and the overhead structure of the passenger cabin may include any suitable fastening mechanism including but not limited to bolts, rivets, welding, or other suitable mechanisms. In these embodiments, the passenger seat assembly 10 may not be connected to a lower structure of the passenger cabin 52. In other embodiments, an additional coupling device including but not limited to a safety bar, a detachable seat tether, or other suitable device may be used to also secure the passenger seat assembly 10 to the lower structure of the passenger cabin 52 for additional structural stability and support as needed. In some embodiments, light fixtures 63 may be positioned on an inner surface 68 of the overhead support structure 16. In these embodiments, the light fixtures 63 may be located adjacent the first pivot location 62 of the overhead support structure 16. However, one of ordinary skill in the relevant art will understand that the light fixtures 63 may be positioned in any suitable location on the overhead support structure 16 or in other suitable locations within the passenger seat assembly 10 or adjacent thereto.

In some embodiments, a lower edge 64 of the seat back support 12 may be pivotally coupled to a rear edge 66 of the seat pan 14. The pivotal coupling between the seat back support 12 and the seat pan 14 may include any suitable coupling arrangement that allows the seat pan 14 to releasably pivot relative to the seat back support 12, while also including a locking mechanism to secure the position of the seat pan 14 relative to the seat back support 12 so that the seat back support 12 may provide sufficient structural stability and support for the seat pan 14. Examples of suitable releasable locking mechanisms include but are not limited to recline locks, gas springs, or other suitable mechanisms.

The seat pan 14 may further comprise a cushion 70 that is coupled to the seat pan 14. The cushion 70 may also serve as a flotation device. In these embodiments, to perform as a flotation device, the cushion 70 includes some amount of flotation material including but not limited to closed-cell foams and flotation foams. In other embodiments, the cushion 70 may not serve as a flotation device and may include any suitable cushion material that provides the desired amount of comfort and support to the passenger.

In some embodiments, as shown in FIGS. 1, 8-9, and 11, a pair of arm rests 72 may be coupled to the seat pan 14. Each arm rest 72 may include at least one support post 74. The support post 74 may be retractable into the body of the seat pan 14 so that the arm rest 72 stows in a position approximately flush with the seat pan 14 and/or the cushion 70. The retractable design of the arm rests 72 allows for less restrictive ingress and egress to and from the passenger seat assembly 10, which may be desirable for handicapped passengers or other passengers that require unrestricted access to enter and/or exit the passenger seat assembly 10.

An end 76 of one of the arm rests 72 may include a control panel with lighting switches, flight attendant call buttons, sound controls, in-flight entertainment controls, seat back 20 recline control, or any other suitable control mechanism related to operation of the passenger seat assembly 10 or any of its amenities. In some embodiments, a retractable cup holder 78 may be coupled to the end 76 of one or both of the arm rests 72. The cup holder 78 may be collapsed to a height that is no greater than the height of the arm rest 72 so that the cup holder 78 may be stowed within a slot 80 located adjacent the end 76 of the arm rest 72 when not in use.

Figure 1:
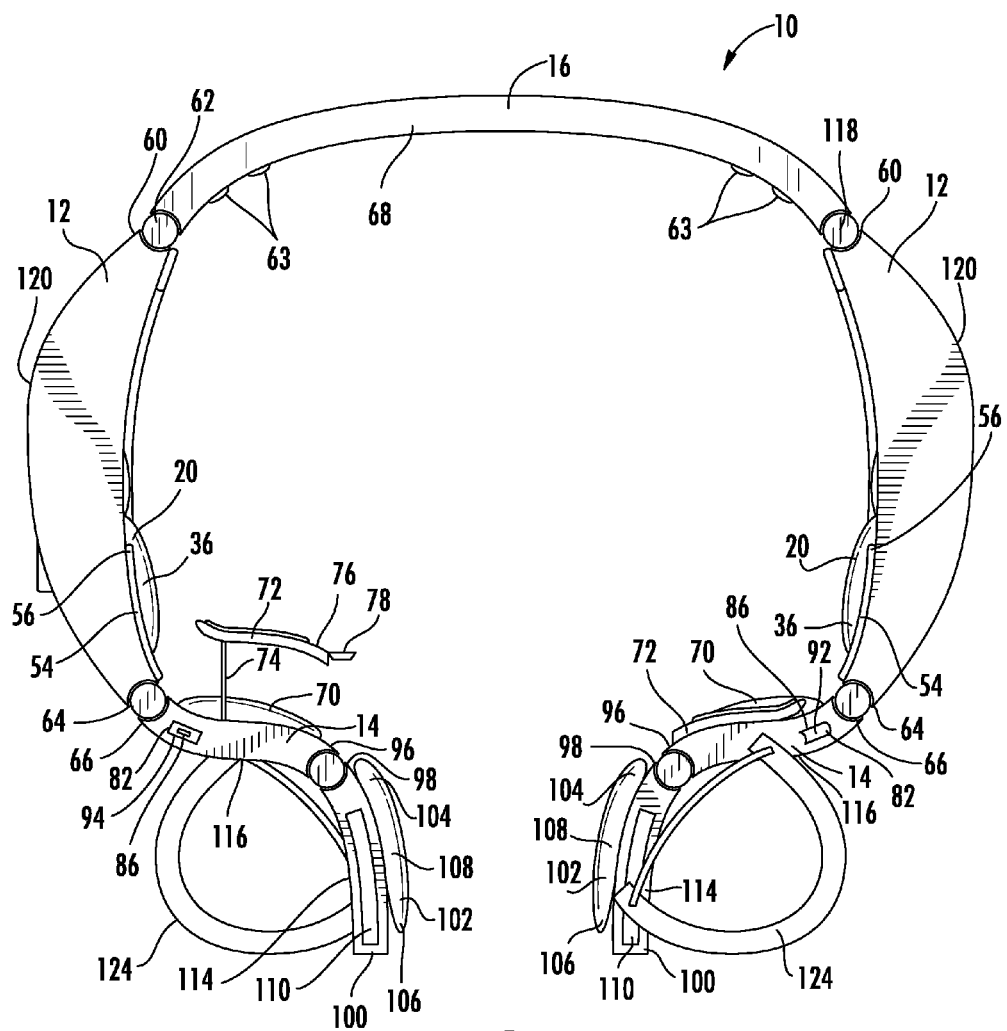
FIG. 1 is a front view of a passenger seat assembly according to one embodiment of the present invention.
Figure 10:
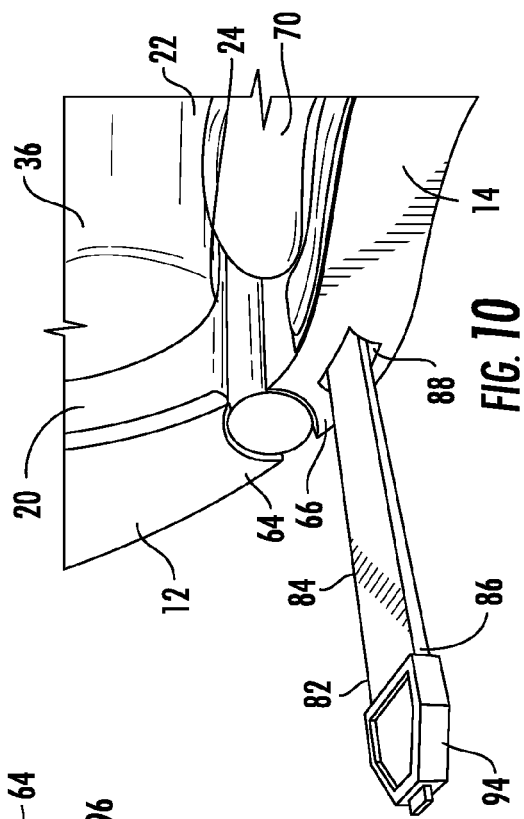
FIG. 10 is a perspective view of a strap and a latching projection of a passenger belt of the passenger seat assembly of FIG. 1.
Figure 8:
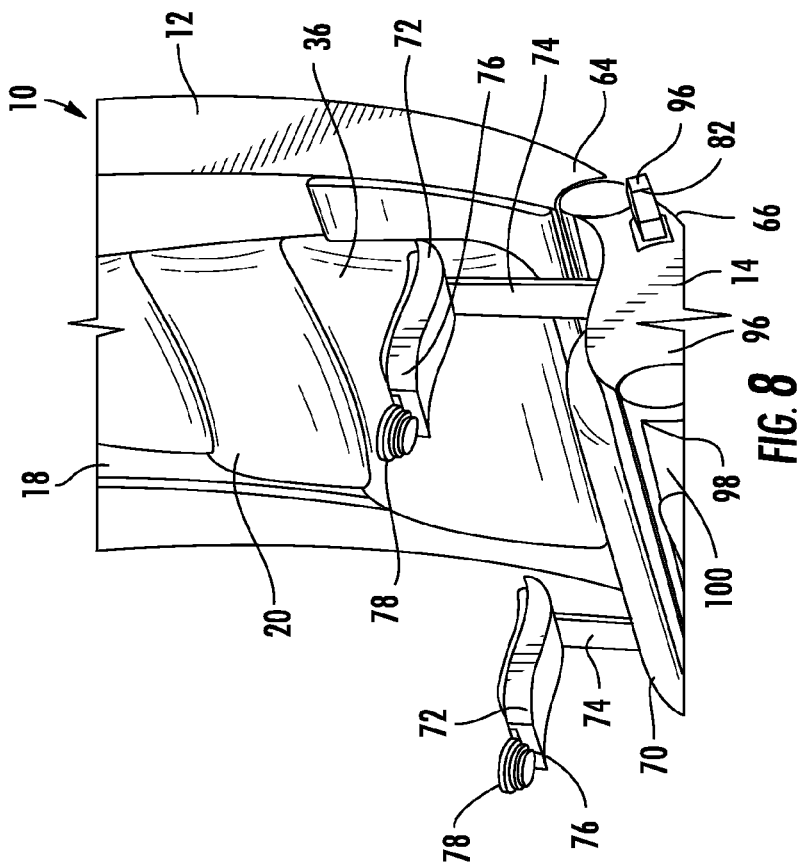
FIG. 8 is partial front perspective view of the passenger seat assembly of FIG. 1 with arm rests in a deployed position.
Figure 12:
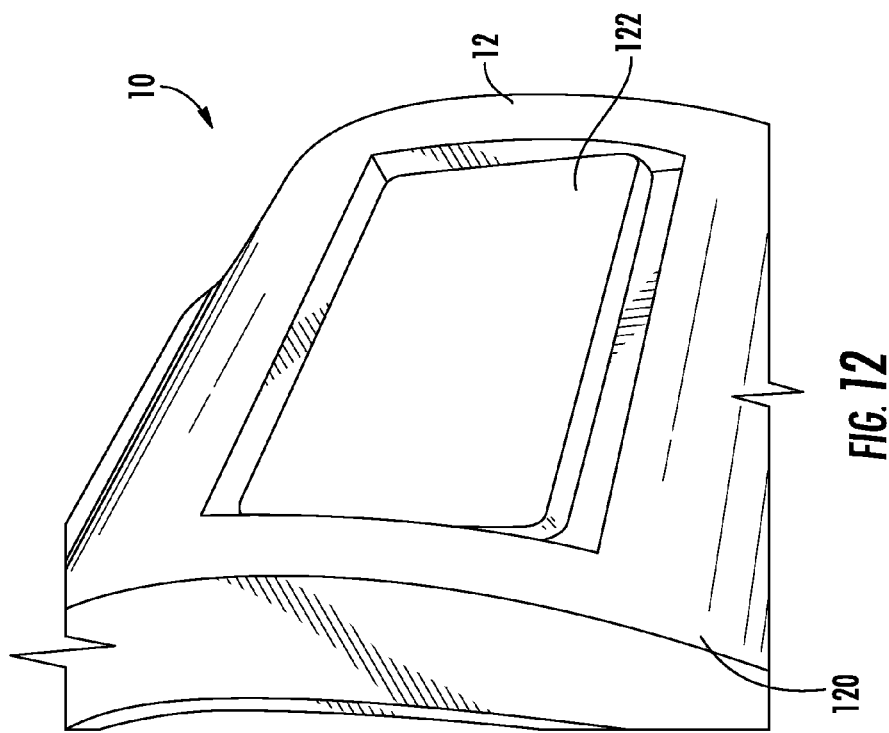
FIG. 12 is a partial perspective view of an in-flight entertainment display of the passenger seat assembly of FIG. 1.

In some embodiments, as illustrated in FIGS. 1, 8, and 10, a passenger belt 82 may be coupled to the seat pan 14. The passenger belt 82 may comprise a pair of straps 84. Each strap 84 may be coupled to a mounting structure within the seat pan 14. An end 86 of each strap 84 may then extend through an aperture 88 in each side 90 of the seat pan 14. A latching receptacle 92 may be coupled to the end 86 of one of the straps 84, and a latching projection 94 may be coupled to the end 86 of the other strap 84. The latching receptacle 92 and the latching projection 94 are configured not to fit within the apertures 88 so as to prevent the straps 84 from fully retracting within the body of the seat pan 14. Each of the straps 84 may be wound around a spring-loaded or otherwise tensioned reel inside the seat pan 14 in a retracted position so that only the latching receptacle 92 and/or the latching projection 94 is visible on the exterior of the seat pan 14. When the end 86 of each strap 84 is pulled to extend each strap 84 from its retracted position, the pulling force contracts the spring so that the spring will cause each strap 84 to retract when the end 86 of each strap 84 is released.

In some embodiments, the passenger seat assembly 10 may comprise at least one foot rest support 100. In these embodiments, a front edge 96 of the seat pan 14 may be pivotally coupled to a top edge 98 of the foot rest support 100. The pivotal coupling between the seat pan 14 and the foot rest support 100 may include any suitable coupling arrangement that allows the foot rest support 100 to releasably pivot relative to the seat pan 14, while also including a locking mechanism to secure the position of the foot rest support 100 relative to the seat pan 14 so that the seat pan 14 may provide sufficient structural stability and support for the foot rest support 100. Examples of suitable releasable locking mechanisms include but are not limited to recline locks, gas springs, or other suitable mechanisms.

In certain embodiments, as shown in FIGS. 1-4 and 13, the passenger seat assembly 10 may include at least one foot rest 102. An upper end 104 of the foot rest 102 is pivotally coupled to the top edge 98 of the foot rest support 100. In these embodiments, a lower end 106 of the foot rest 102 may travel between a retracted position that is approximately flush with the foot rest support 100 and a deployed position, both of these positions being illustrated in FIG. 13. Any suitable deployment mechanism may be used to adjust the position of the foot rest 102 including but not limited to a recline lock or other suitable mechanism that releasably locks the foot rest 102 at any suitable position between and including the retracted and deployed positions. The foot rest 102 may further comprise a cushion 108 that is coupled to the foot rest 102. The cushion 108 may include any suitable cushion material that provides the desired amount of comfort and support to the passenger.

In some embodiments, the foot rest support 100 may also include a cavity 110 within the foot rest support 100 that is configured to hold magazines, flight information, or other personal items that may require stowage.

Figure 2:
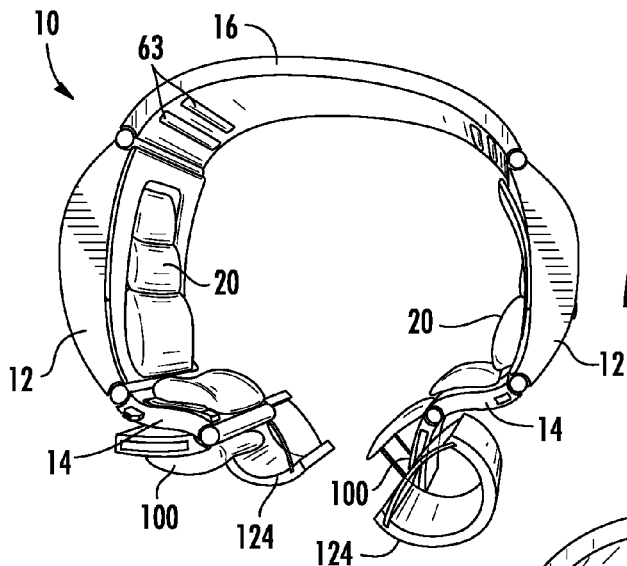
FIG. 2 is a front perspective view of the passenger seat assembly of FIG. 1.
Figure 3:
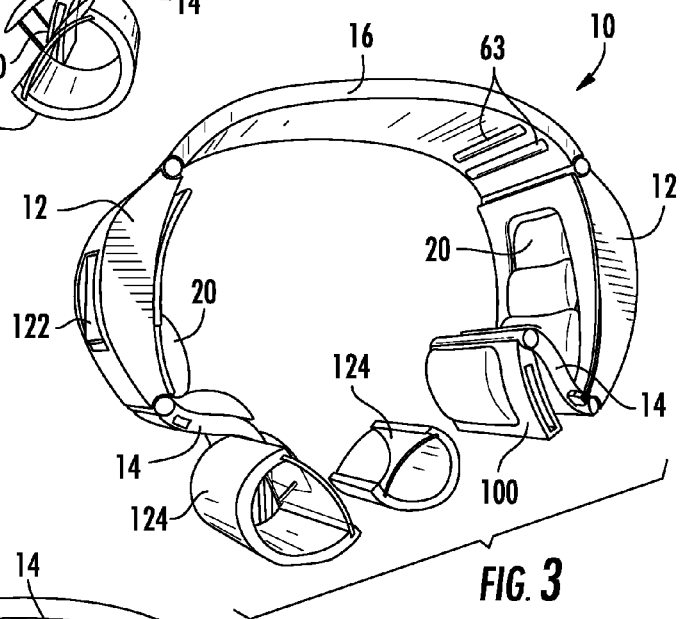
FIG. 3 is a front perspective view of a seat pan of the passenger seat assembly of FIG. 1 with a foot rest and seat pan in a retracted position.
Figure 4:
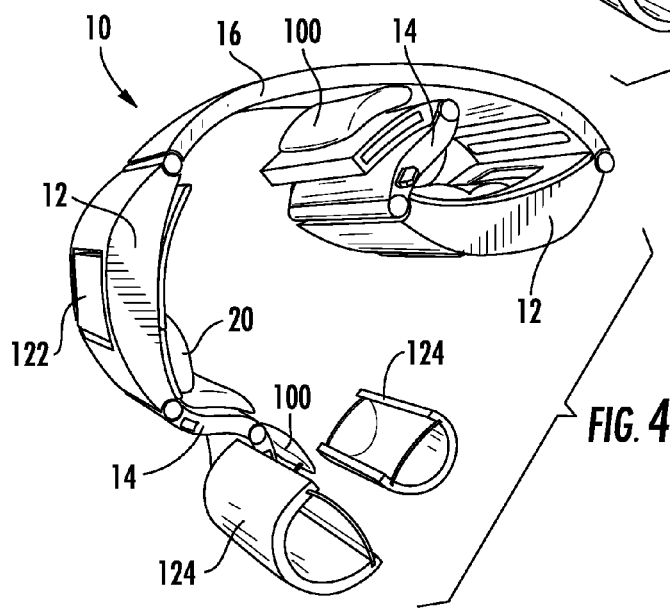
FIG. 4 is a partial front perspective view of the passenger seat assembly of FIG. 1 with a foot rest, seat pan, and seat back support in a retracted position.
Figure 9:
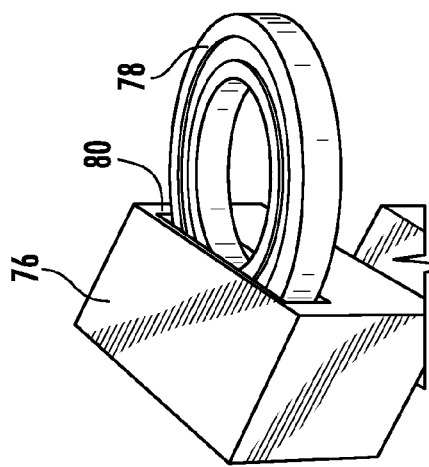
FIG. 9 is a perspective view of a cup holder of the passenger seat assembly of FIG. 1.

In some embodiments, as shown in FIGS. 2-4, the passenger seat assembly 10 may be transitioned from a deployed position (as shown in FIG. 2) to a retracted position (as shown in FIG. 4) and vice versa. To make this transition, the foot rest support 100 may be unlocked from its deployed position and rotated until a backside 114 of the foot rest support 100 is positioned approximately flush to a backside 116 of the seat pan 14. The seat pan 14 may also be unlocked from its deployed position and rotated until the cushion 70 of the seat pan 14 is positioned adjacent the cushion 36 of the seat back 20 (as shown in FIG. 3). The seat back support 12 may also be unlocked from its deployed position and rotated until the cushion 108 of the foot rest support 100 is positioned adjacent the inner surface 68 of the overhead support structure 16.

In certain embodiments, the overhead support structure 16 may include a second pivot location 118 that is also pivotally coupled to a second seat back support 12. In these embodiments, as shown in FIGS. 1-4 and 14, the two seat back supports 12 are coupled to the overhead support structure 16 so that the seat back supports 12 are facing each other. In other words, one seat back support 12 is positioned in a forward-facing direction and the second seat back support 12 is positioned in an aft-facing direction. In these embodiments, the two seat back supports 12 are also offset from each other to provide sufficient room for each seat back support 12, seat pan 14, and foot rest support 100 to retract without interfering with the use or retraction of the other seat back support 12, seat pan 14, and foot rest support 100. Thus, the two pivot locations 62, 118 of the overhead support structure 16 are also offset from each other by a similar distance.

The passenger seat assemblies 10 may be arranged in the passenger cabin 52 so that each passenger seat assembly 10 is slightly nested with the adjacent passenger seat assemblies 10. For example, the forward-facing seat back support 12 of a first passenger seat assembly 10 may be substantially aligned with the aft-facing seat back support 12 of a second passenger seat assembly 10 when both seat back supports 12 are in a deployed position. By utilizing this type of overlapping arrangement, the space between rows of passenger seat assemblies 10 is reduced. However, one of ordinary skill in the relevant art will understand that any suitable arrangement of passenger seat assemblies 10 may be used to provide additional passenger comfort, maximize the use of cabin space, or other desirable goals.

In these embodiments, because of the offset design within the passenger seat assembly 10, each seat back support 12 is arranged to face a rear surface 120 of a similarly-facing seat back support 12 of another passenger seat assembly 10. Thus, the rear surface 120 of each seat back support 12 may be used to mount an in-flight entertainment display 122 for viewing by the passenger in the next row.

In certain embodiments, as shown in FIGS. 1-4 and 14, a stowage compartment 124 for passenger baggage may be positioned adjacent the seat back support 12 in a location that is facing and aligned with the second seat back support 12 in the passenger seat assembly 10. In some embodiments, the stowage compartment 124 is coupled to the lower support structure of the passenger cabin 52. The coupling between the stowage compartment 124 and the lower structure of the passenger cabin 52 may include any suitable fastening mechanism including but not limited to bolts, rivets, welding, or other suitable mechanisms.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A passenger seat assembly comprising:
   (a) an overhead support structure comprising a first pivot location and a second pivot location;
   (b) a first seat comprising a first seat back support pivotally coupled to the first pivot location in a forward-facing direction; and
   (c) a second seat comprising a second seat back support pivotally coupled to the second pivot location in an aft-facing direction;
   wherein the first pivot location is longitudinally offset from the second pivot location by an amount that is approximately the same as a length of the first seat back support or the second seat back support and is laterally offset from the second pivot location by an amount that is approximately the same as a width of the first seat back support or the second seat back support so that the first seat and the second seat each comprises a retracted position adjacent the overhead support structure and a deployed position facing in a direction of the other seat,
   wherein the first seat and the second seat each rotate between the retracted position and the deployed position independently from the other seat.

2. The passenger seat assembly of claim 1, wherein at least one of the first seat back support and the second seat back support comprises a recess configured to receive a seat back, wherein sides of the recess surround at least a portion of the seat back when the seat back is in a reclined position.

3. The passenger seat assembly of claim 2, wherein the recess comprises speakers.

4. The passenger seat assembly of claim 2, further comprising a tray table that is configured to stow in a location adjacent a portion of an outer profile of the recess.

5. The passenger seat assembly of claim 1, further comprising a passenger belt, wherein the passenger belt comprises a pair of straps, wherein each strap is coupled to a mounting structure within a seat pan pivotally coupled to at least one of the first and second seat back supports and extends through an aperture in the seat pan.

6. The passenger seat assembly of claim 5, wherein an end of each of the pair of straps is coupled to a latching projection or a latching receptacle, wherein the latching projection and the latching receptacle are configured not to fit within the aperture so that the end of the strap remains outside the seat pan when the strap is in a retracted position within the seat pan.

7. The passenger seat assembly of claim 1, further comprising arm rests, each arm rest having a stowed position that is configured to be positioned approximately flush with a seat pan pivotally coupled to at least one of the first and second seat back supports.

8. The passenger seat assembly of claim 1, further comprising a stowage compartment positioned adjacent at least one of the first and second seat back supports and coupled to a lower support structure.

9. The passenger seat assembly of claim 1, further comprising an in-flight entertainment display positioned in a rear surface of at least one of the first and second seat back supports.

10. The passenger seat assembly of claim 1, further comprising a foot rest support pivotally coupled to a seat pan, wherein the seat pan is pivotally coupled to at least one of the first and second seat back supports.

11. The passenger seat assembly of claim 10, further comprising a foot rest pivotally coupled to the at least one-foot rest support and configured to rotate between a stowed position and a deployed position.

12. A passenger seat assembly comprising:
   (a) an overhead support structure comprising a first pivot location and a second pivot location;
   (b) a first seat comprising a first seat back support pivotally coupled to the first pivot location in a forward-facing direction; and
   (c) a second seat comprising a second seat back support pivotally coupled to the second pivot location in an aft-facing direction;
   wherein the first pivot location is longitudinally and laterally offset from the second pivot location, wherein the magnitude of the longitudinal offset between the first pivot location and the second pivot location is approximately the same as a length of the first seat back support or the second seat back support, so that the first seat and the second seat each comprises a refracted position adjacent the overhead support structure and a deployed position facing in a direction of the other seat,
   wherein the first seat and the second seat each rotate between the retracted position and the deployed position independently from the other seat.

13. The passenger seat assembly of claim 12, wherein at least one of the first and second seat back supports is pivotally coupled to a seat pan.

14. The passenger seat assembly of claim 13, wherein the seat pan is pivotally coupled to a foot rest support.

15. The passenger seat assembly of claim 14, wherein the foot rest support is configured to rotate into a retracted position adjacent the seat pan.

16. The passenger seat assembly of claim 15, wherein the seat pan is configured to rotate into a retracted position adjacent the at least one first and second seat back supports.

17. A method of stowing a passenger seat assembly, the passenger seat assembly comprising (i) an overhead support structure comprising a first pivot location and a second pivot location; (ii) a first seat comprising a first seat back support pivotally coupled to the first pivot location in a forward-facing direction; and (iii) a second seat comprising a second seat back support pivotally coupled to the second pivot location in an aft-facing direction, wherein the first pivot location is longitudinally and laterally offset from the second pivot location, wherein the magnitude of the longitudinal offset between the first pivot location and the second pivot location is approximately the same as a length of the first seat back support or the second seat back support, the method comprising:

(a) rotating the first seat into a retracted position adjacent the overhead support structure; and (b) independently rotating the second seat into a retracted position adjacent the overhead support structure.

18. The method of claim 17, further comprising:

(c) rotating the first seat into a deployed position, wherein the first seat faces in a direction of the second seat; and (d) independently rotating the second seat into a deployed position, wherein the second seat faces in a direction of the first seat.

19. The method of claim 17, further comprising:

(c) unlocking the first seat prior to rotating into the retracted position; and (d) unlocking the second seat prior to rotating into the retracted position.

\* \* \* \* \*

UNITED STATES PATENT AND TRADEMARK OFFICE
CERTIFICATE OF CORRECTION

PATENT NO. : 8,851,568 B2  
APPLICATION NO. : 13/287158  
DATED : October 7, 2014  
INVENTOR(S) : Robert Funk et al.

It is certified that error appears in the above-identified patent and that said Letters Patent is hereby corrected as shown below:

On the Title page of the patent, under "(73) Assignee:", delete "Seals," and insert --Seats--.

Signed and Sealed this
Seventeenth Day of February, 2015

Michelle K. Lee
*Deputy Director of the United States Patent and Trademark Office*